Patented Dec. 12, 1950

2,533,215

UNITED STATES PATENT OFFICE 2,533,215

PROCESS FOR THE MANUFACTURE OF ARGININE BASE

Dominic J. Bernardi, New York, and Ferdinand A. Dostal, Maspeth, N. Y., assignors to Interchemical Corporation, New York, N. Y., a corporation of Ohio No Drawing. Application September 22, 1948, Serial No. 50,654

2 Claims. (Cl. 260—529)

In the co-pending application Serial No. 624,081, filed October 23, 1945, which matured into Patent No. 2,457,117 of December 28, 1948, a new method is disclosed and claimed for the isolation and preparation of the basic amino acids lysine, arginine, and histidine from a protein hydrolysate. There, the three amino acids are recovered as the monohydrochlorides.

The subject of the present invention is an improvement in the isolation and recovery of arginine which, by following the herein disclosed method is obtained as the free base.

According to the aforementioned patent application protein matter is hydrolyzed by means of mineral acids or enzymes, or by means of combinations thereof. The resulting hydrolysate containing an amino acid mixture which corresponds in its proportions closely to the amino acid composition of the protein that was used in the hydrolysis, after having been neutralized if such neutralization is needed, and after having been freed from humic bodies, unhydrolyzed protein matter and other solids or salts as may be present, and from ammonia, is subjected to an ion-exchange process. For this purpose columns of natural or synthetic zeolites are used which are characterized by permitting ion-exchange in the so-called salt cycle, i. e. base exchangers which substitute one cation against another.

By means of adjusting the pH of the hydrolysate to about 8 and passing it through a first ion-exchange column of the described type, the two basic amino acids lysine and arginine are quantitatively adsorbed in the column. In this manner it is possible to separate them from histidine, the third member of the group of basic amino acids and from all other amino acids of the hydrolysate. After acidifying the effluent from the first column to pH 6 or less, the effluent is passed through a second ion-exchange column of the same type in order to separate the histidine from the other amino acids.

The lysine and arginine are eluted by means of, say, a sodium chloride solution. The eluate from the column, containing lysine- and arginine monohydrochloride, is freed of most of the sodium chloride by alternately concentrating in vacuo and removing crystallized sodium chloride from the hot solution. Having concentrated the effluent in this manner, until it contains about 150 gr. lysine hydrochloride and a proportional amount of arginine monohydrochloride per liter, an equal volume of methyl alcohol is added and salt, which again crystallizes, is removed after heating the extract. Refrigeration overnight, preferably with mechanical stirring, causes lysine monohydrochloride to crystallize. After separating the lysine-monohydrochloride the remaining alcoholic mother liquor contains, aside from the arginine, salts, varying amounts of residual lysine, and different impurities. Upon partial evaporation or evaporation to dryness the mother liquor yields crude, technical grade arginine-monohydrochloride. A method of recovering this amino acid in pure form consists in precipitating the arginine by means of flavianic or other sulfonic acids. However, the free base or the monohydrochloride is recovered from the sulfonic acid compounds only with difficulties and these known procedures do not readily lend themselves for the commercial production of arginine.

We have discovered a method of precipitating the free arginine base directly from the mother liquor and of recovering a pure product at good yields in this manner. The procedure is predicated upon:

(a) Rendering the mother liquor alkaline to a specific pH,
(b) Employing a specific base for the pH adjustment.

Of the various bases, such as sodium hydroxide, ammonium hydroxide, potassium hydroxide, calcium hydroxide and sodium carbonate, only sodium hydroxide is satisfactory. The pH to which the mother liquor must be adjusted may vary from batch to batch but, as a rule, falls between 10.5 and 13. If the pH is appreciably lower or higher the yield is usually nil. The following table serves to illustrate the relation between the pH value to which the mother liquor has been adjusted and the per cent arginine recovered.

| pH | Per Cent recovery |
| --- | --- |
| 10.50 | 0.0 |
| 11.00 | 26.0 |
| 11.35 | 42.2 |
| 11.65 | 60.6 |
| 12.25 | 39.8 |
| 12.50 | 33.0 |
| 12.75 | 21.4 |
| 13.00 | 0.0 |

Although the free arginine base can be efficiently recovered from the aqueous solution, we find that the addition of one to two volumes methyl or ethyl alcohol improves the yield and the purity of the recovered arginine base.

The following example will illustrate the steps of the procedure.

266 pounds of hog's blood from an abattoir, containing 18 percent or 48 pounds of protein matter, are hydrolized under refluxing with 126 pounds of 98 percent sulfuric acid, which has been diluted beforehand, if necessary, so that the initial sulfuric acid concentration is about 24 per cent by volume or 35 per cent by weight. After 16 hours of refluxing, the batch is diluted with an equal volume of water and brought to a pH of about 9.0 by means of adding 36 gallons of lime slurry, containing approximately 100 pounds of slaked lime. Calcium sulfate which forms upon the addition of the lime is removed by means of a filter press. A thorough washing of the filter cake, in order to recover as much as possible of the extract, is achieved by following the filtrate with so much hot water that a total of 172 gallons of process solution results, of an extract concentration of about 3 per cent. At this point the process solution is preferably reduced to about 60 gallons of 8 to 9 per cent extract by means of concentrating in vacuo whereby, incidentally, any ammonia is removed that may have formed during the hydrolysis.

Small amounts of calcium sulfate which precipitate during the vacuum concentration can be removed by either filtration or by means of a centrifugal. Calcium and sulfate ions, remaining in solution, are eliminated after the careful addition of molar equivalents of oxalic acid and barium hydroxide. The extract is then subjected to an ion-exchange process, preferably carried out with the aid of an ion-exchange column filled with a natural or synthetic ion-exchange material which is distinguished by reacting in the so-called salt cycle. Ion-exchange material, sold under the trade name "Decalso" is a suitable product for these specific purposes.

After having adjusted the extract to alkalinity of a pH from 7.5 to 8.0, the extract is pumped, in this specific instant at a rate of about 48 gallons per hour, through a column containing a sufficiently large amount of the prepared ion-exchange material. 120 pounds of the aforementioned "Decalso" allow for an adequate safety margin in the adsorption of substantially all the lysine and arginine contained in the hydrolysate.

Having finished the adsorption cycle, the column is rinsed until the outflow is free of amino acids. Following this rinse, lysine and arginine are eluted by means of a 5 per cent sodium chloride brine of which 70 gallons are pumped through the column at a rate of approximately 1.2 gallons per minute. The eluate, containing lysine- and arginin monohydrochloride, is freed of the larger part of the sodium chloride by alternately concentrating in vacuo and removing crystallized sodium chloride from the hot solution. Having reduced, in this manner, the volume of the concentrate to two gallons or less, an equal volume of methyl alcohol is added and salt, which crystallizes upon this addition, is removed, once more, after having heated the extract. Refrigeration overnight, preferably with mechanical stirring, causes lysine monohydrochloride to crystallize which is separated from the solution. The solution is freed from the methanol by means of a vacuum distillation which permits the recovery of the alcohol. The resulting 7000 cc. of arginine mother liquor are made alkaline to a pH of 11.63 by adding 6900 cc. of 6 N sodium hydroxide.

The pH value of 11.63 was determined empirically as the optimum for the recovery of arginine from this particular batch. For this purpose small aliquots were adjusted to various pH readings within the stated range of pH 10.5 to 13 and the arginine yield of each sample determined in the described manner. Upon the addition of the sodium hydroxide a gelatinous precipitate forms, containing iron hydroxide and magnesium hydroxide, which stems in part from the hemo- globin of the blood and from the lime used in neutralization. This precipitate is filtered off and washed with about 3500 cc. of hot water. The filtrate is then concentrated in vacuo to a volume of about 2700 cc., heated in a boiling water bath for about 20 minutes and filtered hot through a steam heated Büchner funnel to remove crystallized salt. The salt is washed with about 450 cc. of water which is added to the filtrate. The latter is then refrigerated overnight with stirring. We find it advantageous to seed the solution with a crystal of arginine base. The next morning the precipitate which has formed is filtered off and washed thoroughly with methanol, sucked dry and dried in a vacuum oven at 70° C. The yield is slightly more than 40% of the arginine present in the mother liquor. After recrystallization the arginine base shows: less than 0.1% of lysine, 0.0% ash, 31.85% N.

One modification of the procedure which results in somewhat higher yields of a still purer product is to add 1 to 3 volumes of methyl alcohol to the concentrate after the removal of the salt. After the addition of 2 volumes of methanol to a similar batch the yield exceeds 60% of the theoretical and the product shows, after recrystallization, an optical rotation of $$(\alpha)_D^{23°C.} = 25.0°$$

in 1 N HCl, indicating pure 1(+) arginine.

If particular emphasis is placed upon the preparation of chemically pure arginine rather than other amino acids, a protein should be selected which is relatively high in arginine. Gelatine, for instance, is about 25 per cent higher in arginine than blood protein.

Having illustrated our new method, we claim:

1. The recovery of free arginine base from a mother liquor containing arginine, residual lysine, and impurities, by adjusting the mother liquor to alkalinity of a pH above 10.5 and below 13 with sodium hydroxide, removing any precipitate which forms upon the addition of the sodium hydroxide, removing crystallized salt from the hot solution after concentration in vacuo, refrigerating, and separating the crystallized arginine base.

2. The recovery of free arginine base from a mother liquor containing arginine, residual lysine, and impurities, by adjusting the mother liquor to alkalinity of a pH above 10.5 and below 13 with sodium hydroxide, removing any precipitate which forms upon the addition of the sodium hydroxide, removing crystallized salt from the hot solution after concentration in vacuo to 15–25 gr. arginine per 100 cc., seeding, refrigerating the solution with stirring, and separating the crystallized arginine base.

DOMINIC J. BERNARDI.
FERDINAND A. DOSTAL.

REFERENCES CITED

The following references are of record in the file of this patent:

UNITED STATES PATENTS

| Number | Name | Date |
|---|---|---|
| 1,973,574 | Marshall | Sept. 11, 1934 |
| 2,347,220 | Shildneck | Apr. 25, 1944 |
| 2,373,342 | Royal | Apr. 10, 1945 |
| 2,433,219 | Hoglan | Dec. 23, 1947 |

OTHER REFERENCES

Block: Archives of Biochem., vol. 11, pp. 236–247.